(12) United States Patent
Jansson (10) Patent No.: US 9,275,766 B2
(45) Date of Patent: Mar. 1, 2016

(54) APPARATUS FOR VERTICALLY SEGMENTING A BOILING WATER REACTOR CONTROL ROD BLADE

(75) Inventor: Hakan Jansson, Strangnas (SE)

(73) Assignee: Westinghouse Electric Company LLC, Cranberry Township, PA (US)

( * ) Notice: Subject to any disclaimer, the term of this patent is extended or adjusted under 35 U.S.C. 154(b) by 878 days.

(21) Appl. No.: 13/612,982

(22) Filed: Sep. 13, 2012

(65) Prior Publication Data

US 2013/0129031 A1    May 23, 2013

Related U.S. Application Data

(60) Provisional application No. 61/561,974, filed on Nov. 21, 2011.

(51) Int. Cl.
| | |
|---|---|
| *B23D 53/04* | (2006.01) |
| *B23D 55/08* | (2006.01) |
| *G21C 19/32* | (2006.01) |
| *B23D 53/00* | (2006.01) |
| *G21F 9/30* | (2006.01) |

(52) U.S. Cl.
CPC .............. *G21C 19/32* (2013.01); *B23D 53/003* (2013.01); *B23D 53/005* (2013.01); *G21F 9/30* (2013.01); *B23D 53/04* (2013.01); *B23D 55/08* (2013.01); *Y10T 83/7189* (2015.04)

(58) Field of Classification Search
USPC .......................................................... 83/808
See application file for complete search history.

(56) References Cited

U.S. PATENT DOCUMENTS

| | | | |
|---|---|---|---|
| 684,919 A * | 10/1901 | Dees | 83/404.4 |
| 3,672,247 A * | 6/1972 | Cherel | 83/35 |
| 4,295,401 A | 10/1981 | Mullett | |
| 4,317,398 A * | 3/1982 | Jones et al. | 83/156 |
| 4,434,092 A | 2/1984 | Mary | |
| 4,507,840 A | 4/1985 | Steinert et al. | |
| 4,643,845 A | 2/1987 | Omote et al. | |
| 4,730,527 A | 3/1988 | Eisenacher et al. | |
| 5,055,236 A | 10/1991 | Krieg | |
| 5,088,363 A * | 2/1992 | Jones et al. | 83/35 |
| 5,239,564 A | 8/1993 | Jacquier et al. | |
| 5,247,545 A | 9/1993 | Cearley et al. | |
| 5,329,562 A | 7/1994 | Kubo et al. | |
| 2003/0231733 A1 * | 12/2003 | Weber et al. | 376/272 |
| 2010/0046691 A1 | 2/2010 | Hummel | |
| 2010/0071527 A1 | 3/2010 | Aihara et al. | |

OTHER PUBLICATIONS

International Preliminary Report on Patentability for PCT/US2012/062537 dated Jun. 5, 2014 (Forms PCT/IB/373, PCT/ISA/237).

* cited by examiner

*Primary Examiner* — Tashiana Adams
*Assistant Examiner* — Sean P Burke
(74) *Attorney, Agent, or Firm* — Richard J. Coldren; Westinghouse Electric Company LLC (57) ABSTRACT

Apparatus for longitudinally segmenting a cruciform shaped irradiated boiling water reactor control rod having four elongated blades radially extending from a central spline, into four flat panels. The apparatus employs a double bladed band saw with the band saw blades orthogonally oriented at two different elevations and having one side of each band saw blade crossing over the center of the spline of the control rod in between the control rod blades.

20 Claims, 8 Drawing Sheets

APPARATUS FOR VERTICALLY SEGMENTING A BOILING WATER REACTOR CONTROL ROD BLADE

CROSS REFERENCE TO RELATED APPLICATION

This application claims priority to Provisional Application Ser. No. 61/561,974, filed Nov. 21, 2011, and is related to patent application Ser. No. 13/612,905, filed Sep. 13, 2012 (now issued U.S. Pat. No. 8,857,027, issued Oct. 14, 2014), entitled METHOD OF SEGMENTING IRRADIATED BOILING WATER REACTOR CONTROL ROD BLADES, filed concurrently herewith.

BACKGROUND

1. Field

This invention relates generally to the storage, transportation and disposal of highly radioactive components, and, more particularly to apparatus for vertically segmenting a boiling water reactor control rod blade to facilitate storage and/or transportation.

2. Description of Related Art

One type of commonly used boiling water nuclear reactor employs a nuclear fuel assembly comprised of fuel rods surrounded by a fuel channel. Each fuel channel of a boiling water reactor typically consists of a hollow, linear, elongated, four-sided channel of integral construction, which except for its rounded corner edges, has a substantially square cross section. Commonly, each channel is roughly 14 feet (4.27 meters) long by five inches (12.7 cms.) square and laterally encloses a plurality of elongated fuel elements. The fuel elements are arranged to allow for the insertion of a cruciform shaped control rod, which, during reactor operation, is movable vertically to control the nuclear reaction. As is generally known, the control rods come in a number of similar shapes, e.g., an American version, a Nordic version and a German version, and generally include an upper portion having a handle and four upper ball rollers for guiding the upper portion of the control rod as it moves vertically and a lower portion comprising a lower casting that in at least one of the versions functions as a velocity limiter and lower ball rollers that serve as a lower guide for the vertical movement. The main body structure, between the upper and lower portions, includes four blades or panels which extend radially from a central spline. Preferably, the blades extend longitudinally to at least a height that substantially equals the height of the fuel elements, which is approximately 12 feet (3.66 meters). The width of the control rods at the blade section is approximately twice the width of the panels, which is in the order of 10 inches (25.4 cms.) and the blades are approximately 2.8 inches (7 mils.) thick.

Following functional service, boiling water reactor control rod blades are difficult to store and dispose of because of their size, configuration, embrittled condition, and radiological activity. Heretofore within the United States, in-pool storage of control rod blades has been extremely space inefficient and dry cask storage is not readily available. The control rod design may vary with the manufacturer, but the four-panel design with the panels radially extending from a central spline at 90° intervals around the circumference of the control rod is common to all of the boiling water reactor designs, and thus, a common storage problem.

Control rod blades and other irradiated hardware are typically Class C low level radioactive waste as defined and determined pursuant to 10 CFR §61 and related regulatory guidance e.g., NRC's Branch Technical Position on Concentration Averaging and Encapsulation. Since Jul. 1, 2008, low level radioactive waste generators within the United States that are located outside of the Atlantic Compact (Connecticut, New Jersey and South Carolina) have not had access to Class B or Class C, low level radioactive waste disposal capacity. Lack of disposal capacity has caused boiling water reactor operators considerable spent fuel pool overcrowding. Though currently very uncertain and subject to numerous regulatory and commercial challenges Class B and Class C, low level radioactive waste disposal capacity for the remainder of the United States low level radioactive waste generators is anticipated in the relatively near future.

One technique for reducing the volume of boiling water reactor control rods for spent fuel pool storage has been to sever the upper and lower portions of the control rods from the control rods' blades. In the remaining main blade structure, the individual blade sections have been removed from the central spline by longitudinal cuts and the severed parts are then stacked for storage or burial as described in U.S. Pat. No. 4,507,840. This type of process requires three approximately 4 meter long cuts with handling time in between that makes this an arduous process. The packing of the segmented blades is also inefficient leading to high customer costs. An alternate approach has been taken in U.S. Pat. No. 5,055,236, which suggests that a vertical cut be made along the center line of the spline to divide the control rod blades into two chevrons. The chevrons can then be closely stacked for storage. Each of the approaches yields 12-foot (3.6 meters) or longer segments that are costly to shield and transport. U.S. Pat. No. 4,507,840 recognizes that since the blades enclose neutron absorber rods, which contain radioactive gas, the vertical cuts must be made quite near the central spline to avoid releasing the radioactive gases. Thus, horizontal segmentation of the blades, which would cut across the sealed rods that contain the neutron absorber material and the radioactive gases, while making the handling of the blades more manageable, is problematic. Copending patent application Ser. No. 13/612,905, filed Sep. 13, 2012, now issued U.S. Pat. No. 8,857,027, issued Oct. 14, 2014, overcomes this difficulty, but first requires a convenient way to the vertically segment the blades into four flat panels.

Therefore, for safe and cost effective shipment and storage of a spent boiling water reactor control rod a new apparatus is desired for vertically segmenting the control rod blades in an efficient manner to make the blades more amenable to further lateral segmentation to reduce the storage volume of the component to a manageable size that can be packaged in a dry cask.

Additionally, such an apparatus is desired that will minimize the release of radioactive debris in segmenting a boiling water reactor control rod.

SUMMARY

These and other objects are achieved by the apparatus claimed hereafter for reducing the storage volume of a boiling water reactor control rod by simultaneously, vertically severing the control rod spline along a central axis extending along an elongated dimension of the spline, into four substantially equal sections without cutting through the blade panels. In one preferred embodiment, the apparatus is a double bladed band saw having a tool base plate including a first pair of spaced pulley wheels rotably supported from one side of the tool base plate. One of the first pair of spaced pulley wheels includes a drive wheel that is operatively connected to a motor to rotate the drive wheel when the motor is in an on state. A second of the first pair of spaced pulley wheels is oriented along a first axis extending between the drive wheel and the second of the first pair of spaced pulley wheels. A first band saw blade extends around the drive wheel and the second of the first pair of spaced pulley wheels. A first side of the first band saw blade extends between the drive wheel and the second of the first pair of spaced pulley wheels and around the second of the first pair of spaced pulley wheels. A second side of the first band saw blade extends between the second of the first pair of spaced pulley wheels and the drive wheel and around the drive wheel. Furthermore, the first side of the first band saw blade extends over a first opening in the tool base plate that is sized for the boiling water reactor control rod to axially pass therethrough in a direction of the central axis. A second pair of spaced pulley wheels is vertically supported from the one side of the tool base plate with one of the second pair of spaced pulley wheels comprising a follower wheel that is operably connected to the drive wheel to rotate the follower wheel when the motor is in an on state. A second of the second pair of spaced pulley wheels is oriented along a second axis extending between the follower wheel and the second of the second pair of spaced pulley wheels with the second axis being oriented at a fixed angle greater or less than zero relative to the first axis. A second band saw blade extends around the follower wheel and the second of the second pair of spaced pulley wheels with a first side of the second band saw blade extending between the follower wheel and the second of the second pair of spaced pulley wheels and around the second of the second pair of spaced pulley wheels. A second side of the second band saw blade extends between the second of the second pair of spaced pulley wheels and around the follower wheel wherein the first side of the second band saw blade extends over the first opening in the tool base plate that is sized for the boiling water reactor control rod to pass therethrough.

In one embodiment, the follower wheel is connected to the drive wheel with a chain and sprocket coupling. Preferably, the drive wheel and the follower wheel respectively drive the first and second band saw blades at approximately the same speed. Desirably, the first side of the first band saw blade and the first side of the second band saw blade cross one another over the central axis of the spline when the boiling water reactor control rod is positioned in the first opening in the tool base plate.

In one preferred embodiment, the first opening in the tool base plate includes guide supports to contact and guide each side of the panels of the control rod through the first opening in the tool base plate when the boiling water reactor control rod panels extend through the opening. Preferably, the guide supports extend on either side of the first opening in the tool base plate and in one embodiment the guide supports are wheels positioned on either side of each panel and supported at different elevations relative to the central axis. Desirably, the different elevations are approximately 50 millimeters apart.

The tool base plate may also include an attachment interface that is connectable to a guide post or rail that extends in a direction parallel to the central axis when the boiling water reactor control rod panels extend through the first opening. Means are provided for moving the tool base plate along the guide post or rail in a direction parallel to the central axis. Preferably, the means for moving the tool base plate is an overhead crane and the guide post or rail is either supported from the bottom of the spent fuel pool or from the reactor building floor where it extends into the pool at least six meters.

In another preferred embodiment, the first and second band saw blades operate to substantially simultaneously cut the boiling water reactor control rod vertically along the spline dividing the boiling water reactor control rod spline into four substantially equal sections. Desirably, when in an upper position above the boiling water reactor control rod, the tool can be rotated 180° to facilitate maintenance.

In a further embodiment, the motor may be a hydraulic motor and the tool base plate preferably is outfitted with a camera, or more preferably a plurality of cameras for observing and managing the cutting process. Desirably, the fixed angle is approximately 90°.

BRIEF DESCRIPTION OF THE DRAWINGS

A further understanding of the invention claimed hereafter can be gained from the following description of the preferred embodiments when read in conjunction with the accompanying drawings in which:

DESCRIPTION OF THE PREFERRED EMBODIMENT

Figure 1:
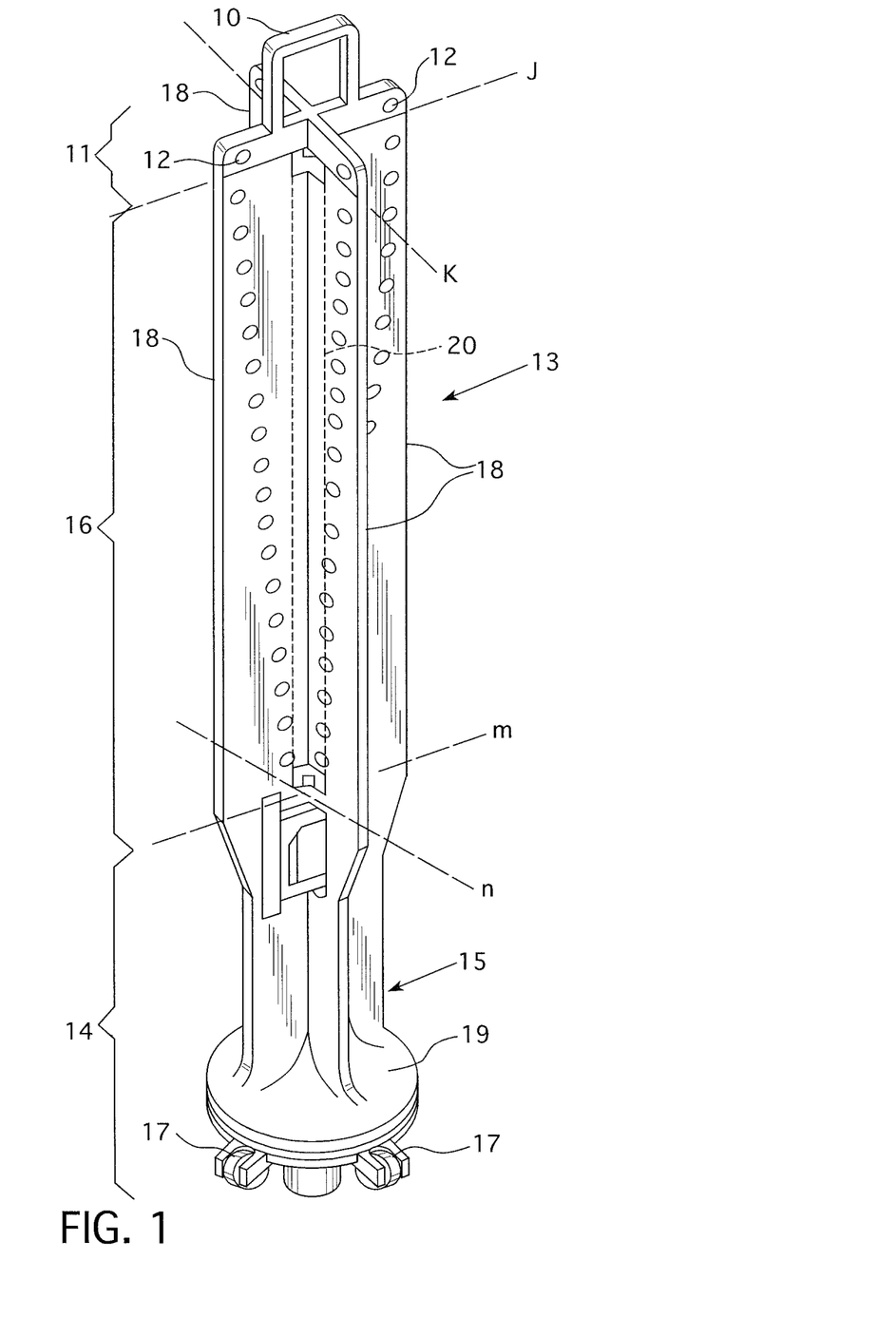
FIG. 1 illustrates a boiling water reactor control rod blade of the type to which the present invention is applicable.

FIG. 1 shows a boiling water reactor control rod blade 13 of the type to which the present invention is applicable. As such, the control rod blade comprises an upper portion 11 having an upper handle 10 and four upper ball rollers 12; a lower portion 14 having a lower casting 15 and lower ball rollers 17; and a main blade structure 16 therebetween. The main blade structure 16 includes four panels or blades 18 arranged in a cruciform shape about a central spline 20. According to one embodiment of the invention, the lower portion 14 is removed by cutting approximately in the plane defined by lines m and n, and the upper portion 11 is removed by cutting in a transverse plane defined by lines j and k. Another alternative is to just cut around the rollers to remove them or to leave the handle 10 in place. Although it is possible to practice the invention without removing the rollers, it is desirable to do so since they typically contain cobalt and from a radiological perspective, are reactively much hotter than the other portions of the control rod blade.

For the general purposes of this description, the principal components of a control rod blade are an upper portion containing the lifting handle 10 and the stellite rollers 12, a lower portion 14 containing the velocity limiter 19 and stellite rollers 17 and the central portion containing the cruciform shaped main body 16 including the blades or panels 18 and the central spline 20. To consolidate the control rod blade section 16 the upper portion 11 and the lower portion 14 are first removed in a manner consistent with existing art as part of a control rod blade volume reduction process.

The cruciform shaped main body 16 is comprised of four sheathed metallic "panels" 18 of metallic tubes containing powdered boron carbide or other neutron absorbing material that are welded together and to the central spline 20 lengthwise at opposing angles to form the cruciform shape. Because of the radioactive nature of the control rod, it is necessary for the volume reduction process to be performed under water, most preferably in the spent fuel pool. To separate the control rod into practically transportable segments or segments that can be more efficiently stored in a spent fuel pool, it will be necessary to longitudinally segment the main body portion 16 so that the panels 18 can be stacked or further, laterally segmented so they can fit into casks for transport. However, under water lateral segmentation of the panels 18 will rupture both the sheathing and the tubes contained within the sheathing of the panels 18 thereby exposing the spent fuel pool to unwanted debris in the form of sheathing material, tubes and boron carbide. Embrittlement of the control rod blades caused by the extended neutron exposure that they will have experienced within the reactor compounds the difficulty of the segmentation process.

One prior art method employed to reduce the volume of the control rod blades for storage includes the mechanical longitudinal segmentation of the control rod blade cruciform shape main body 16 through the center spline 20 resulting in two chevron shaped sections as described in U.S. Pat. No. 5,055, 236. Segmentation in this fashion substantially improves the in-pool storage efficiency, but does not lend the chevrons to a practical form for transportation to a remote site for storage or for lateral segmentation. One aspect of the device described herein is to further longitudinally segment each chevron along the remaining portion of the spline 20 thereby resulting in four separate detached panels 18. This subsequent segmentation will improve in-pool storage efficiency, and substantially facilitate the lateral panel segmentation process that will facilitate containerization and optimal radiological characterization for purpose of shipment and disposal.

The embodiment described herein provides a double bladed band saw for efficiently dividing the main body portion 16 into four separate panels 18 that do not require further processing after a long longitudinal cut is made through the spline 20 in a single pass. Also, only one four meter long cut is required. The apparatus described hereafter to segment the cruciform blades into four, four-meter long flat panels 18 will facilitate a large space reduction for further backend handling and storage. Cutting and handling time on site will be reduced significantly with this device. A precise cut through the spline 20 of the control rod with the two band saw blades is made so that the boron (or other neutron absorbing material) content of the control rod blades stays intact without leakage to the spent fuel pool water.

In accordance with this embodiment, the control rod to be cut is positioned (with the on-site refueling machine) in a submerged cutting position (in the spent fuel pool or reactor internals pool). The bottom part of the control rod, the velocity limiter 19 with the stellite rollers 17 and the stellite rollers 12 at the top of the control rod are preferably first removed. The main blade structure 16 and what remains of the upper portion 11 is then preferably supported from the bottom of the pool. Two cuts, 90° apart are then substantially simultaneous made down the center of the spline to separate the control rod blade into four panels 18.

Figure 2:
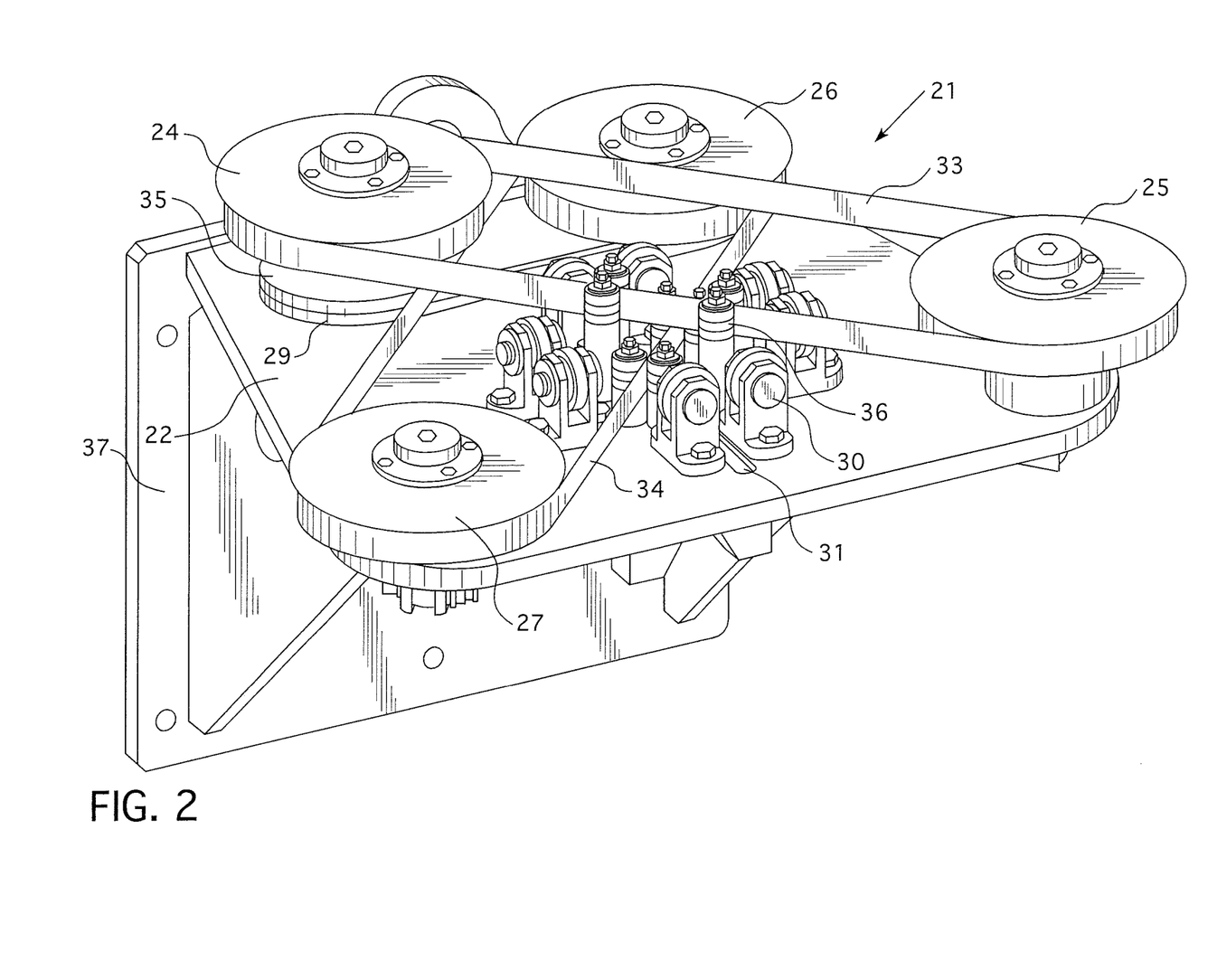
FIG. 2 is an isometric view of the upper portion of the base plate supporting the double bladed band saw of one preferred embodiment of the invention.
Figure 3:
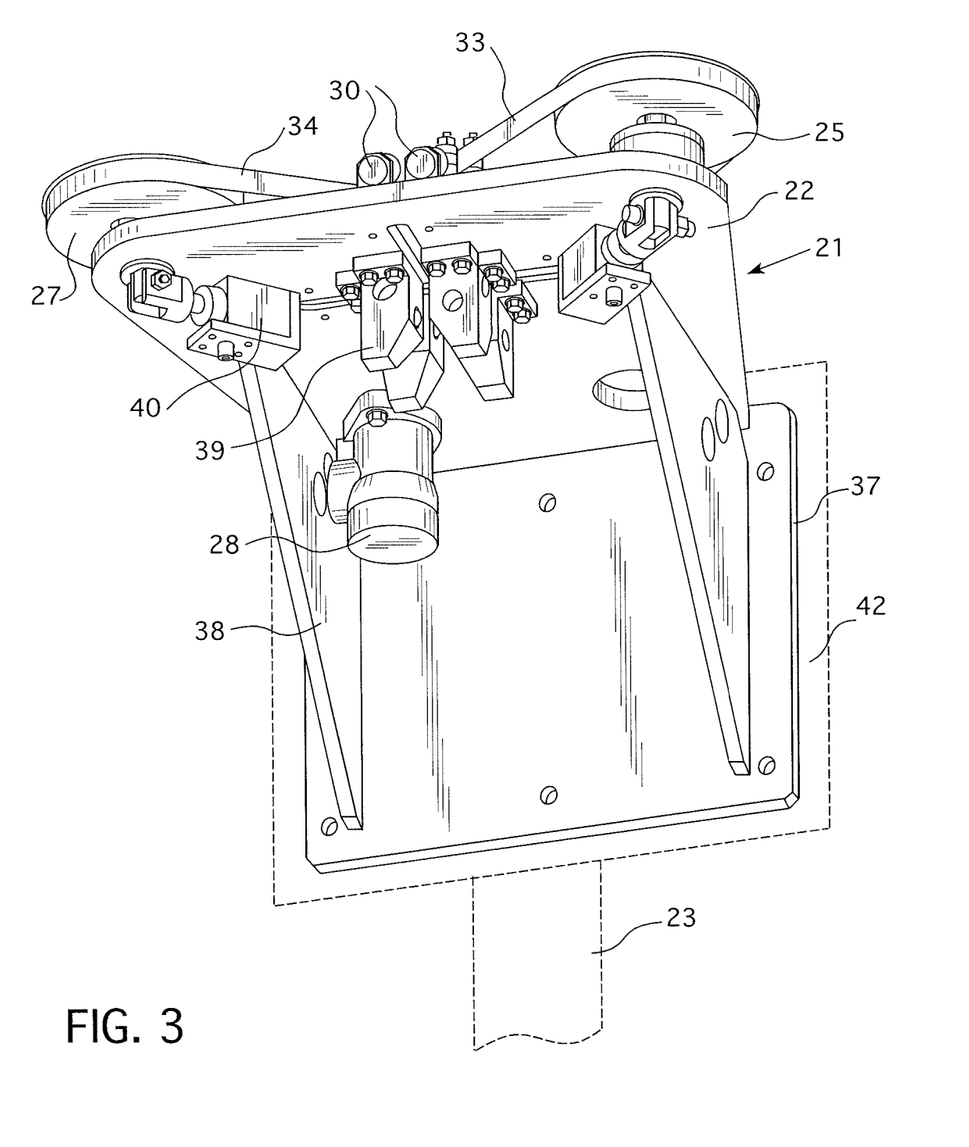
FIG. 3 is an isometric view of the underside of the base plate illustrated in FIG. 3, with an attachment carriage and guide rail shown in phantom.

As shown in FIGS. 2 and 3, which illustrates one preferred embodiment of this invention, a new band saw 21 is provided which can be used to obtain the simultaneous cut of the spline 20, previously described. The band saw 21 comprises a base plate 22 that is attached to a hoist rail 23 (shown in phantom in FIG. 3). The attachment of the tool base plate to the rail 23 can take any one of several forms, but as shown in FIG. 3 it includes a vertically oriented attachment plate 37 which is affixed at right angles to the tool base plate 22 and reinforced by gussets 38. The attachment plate 37 is connected, e.g., bolted, to a travel carriage 42 which rides on the guide rail 23. The guide rail 23, in the cutting position extends from either the containment floor to about six meters down into the spent fuel pool or from the bottom of the spent fuel pool to a height of at least four meters. The hoist which can be an overhead crane, feeds the band saw 21 downwards along the hoist rail 23 during the cutting operation. At the uppermost position, the band saw 21 can be rotated 180° to facilitate maintenance work.

Figure 4:
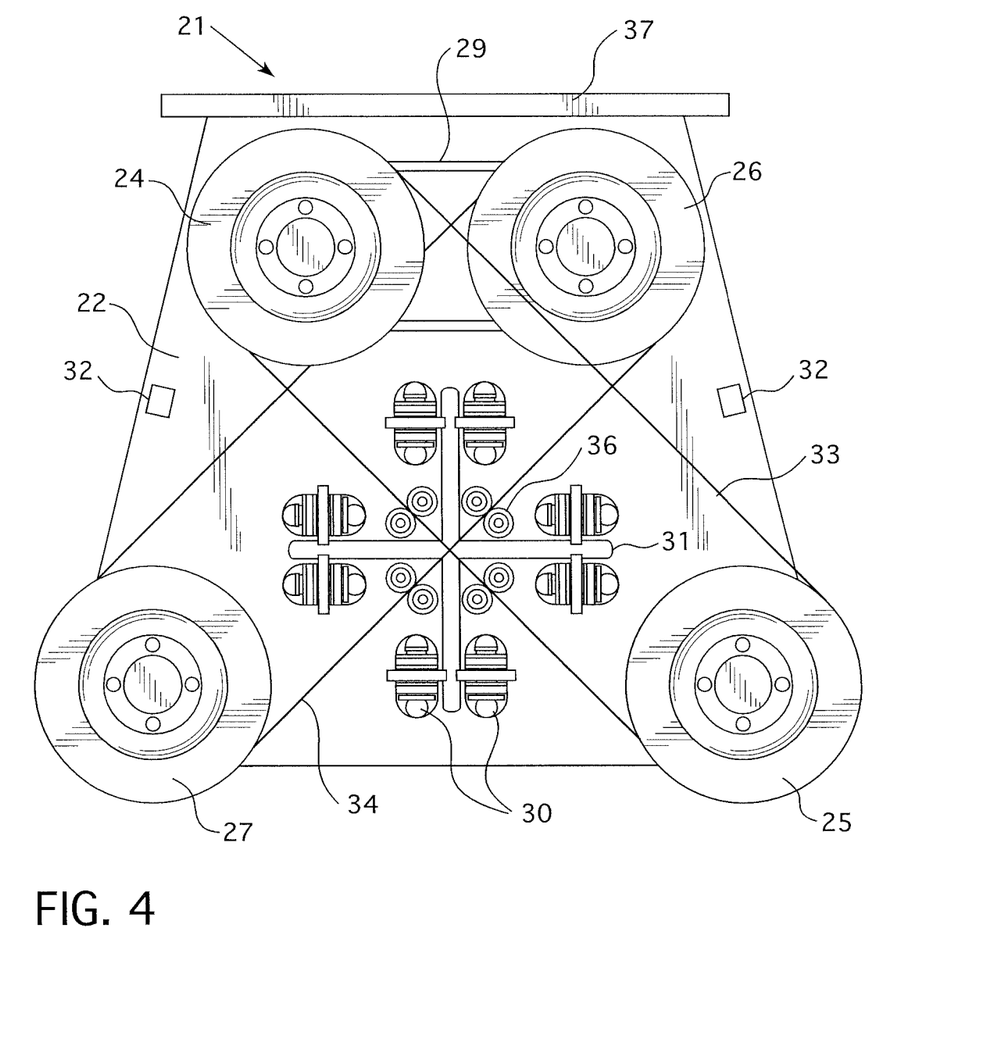
FIG. 4 is a plan view of the embodiment shown in FIG. 2.
Figure 5:
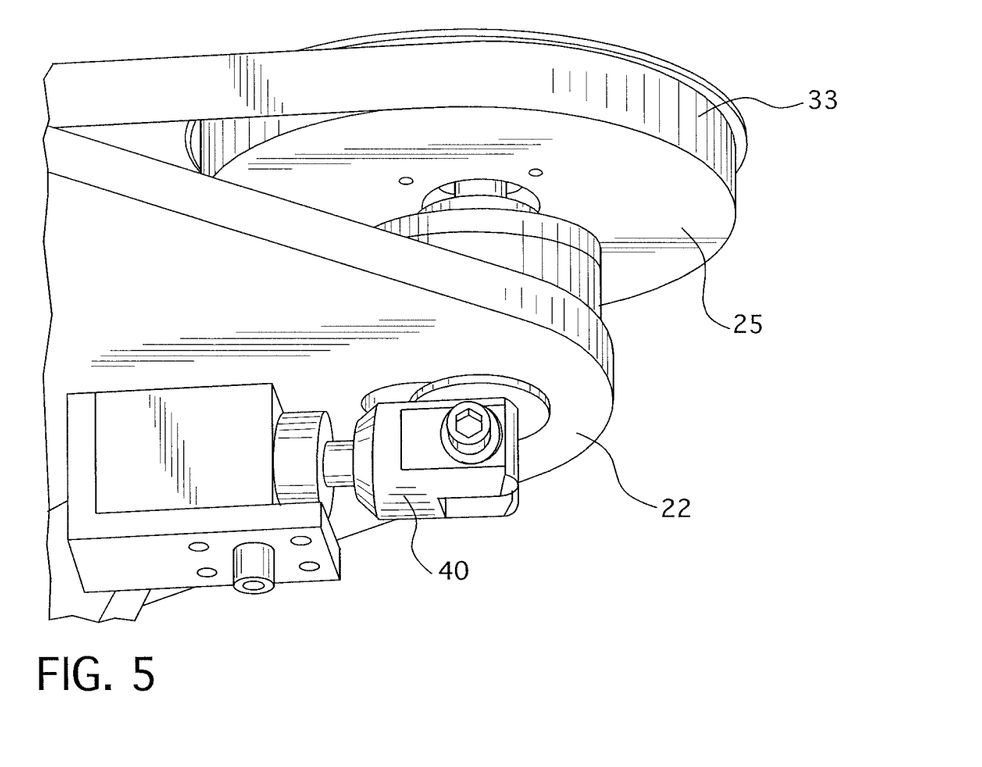
FIG. 5 is an enlarge isometric view of the pulley wheel tensioner shown in FIG. 3.
Figure 6:
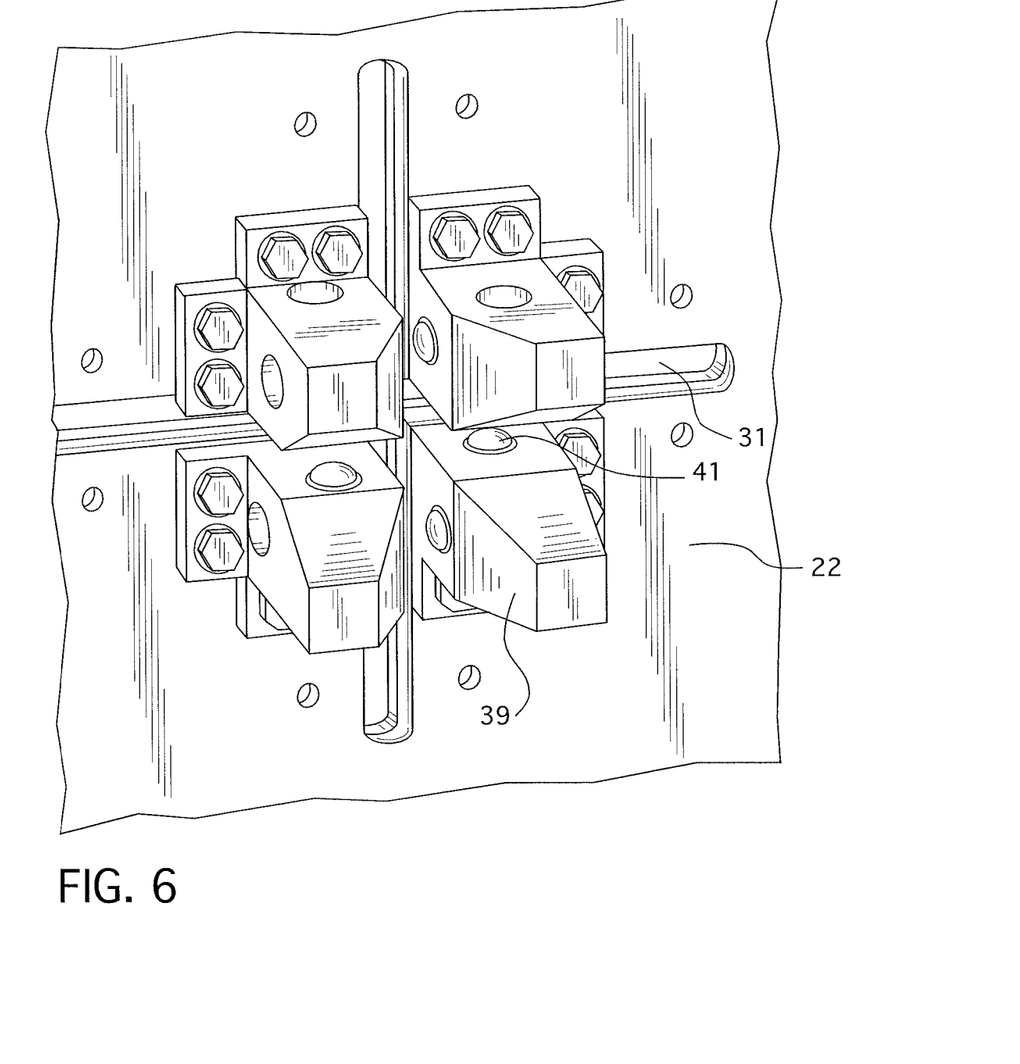
FIG. 6 is an enlarged isometric view of the lower control rod guides shown in FIG. 3.
Figure 7:
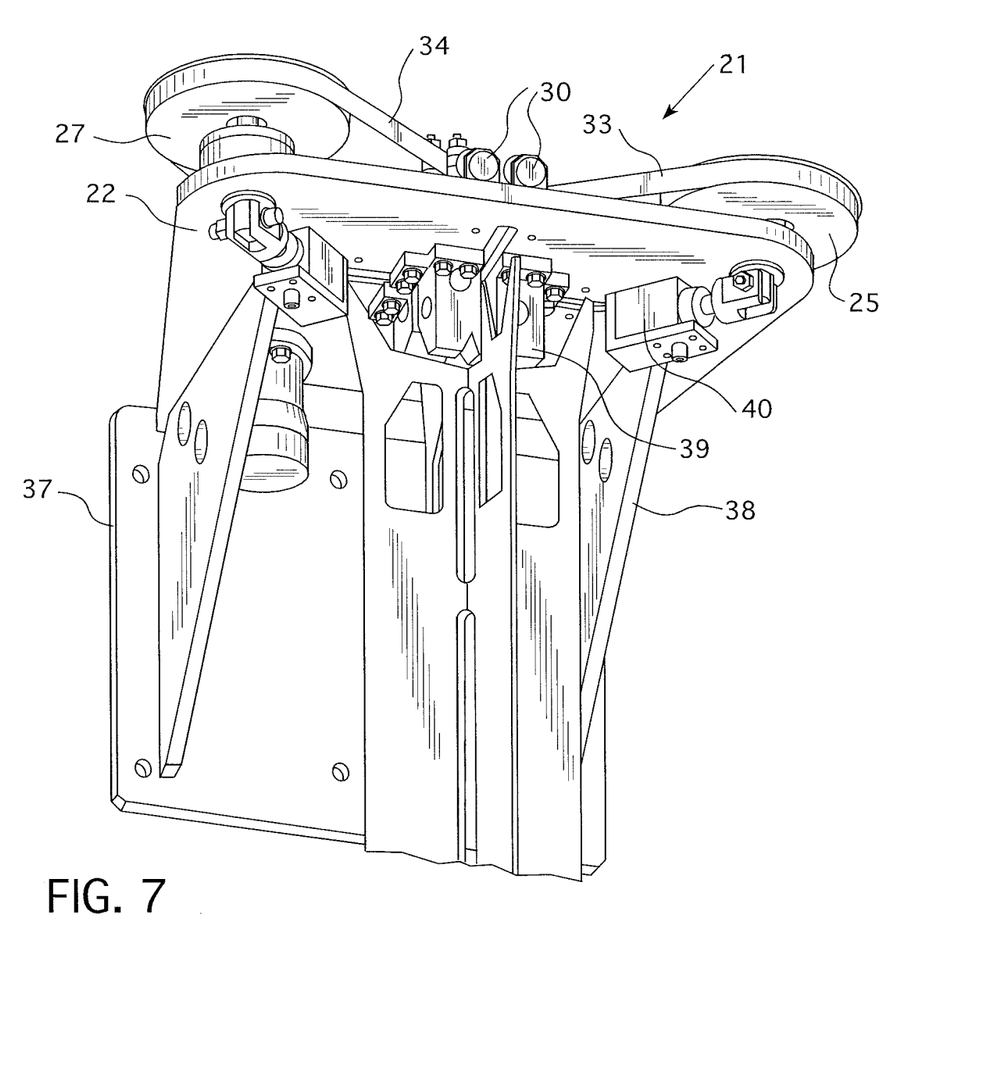
FIG. 7 is an isometric view of the underside of the embodiment shown in FIG. 3 being lowered over a control rod.
Figure 8:
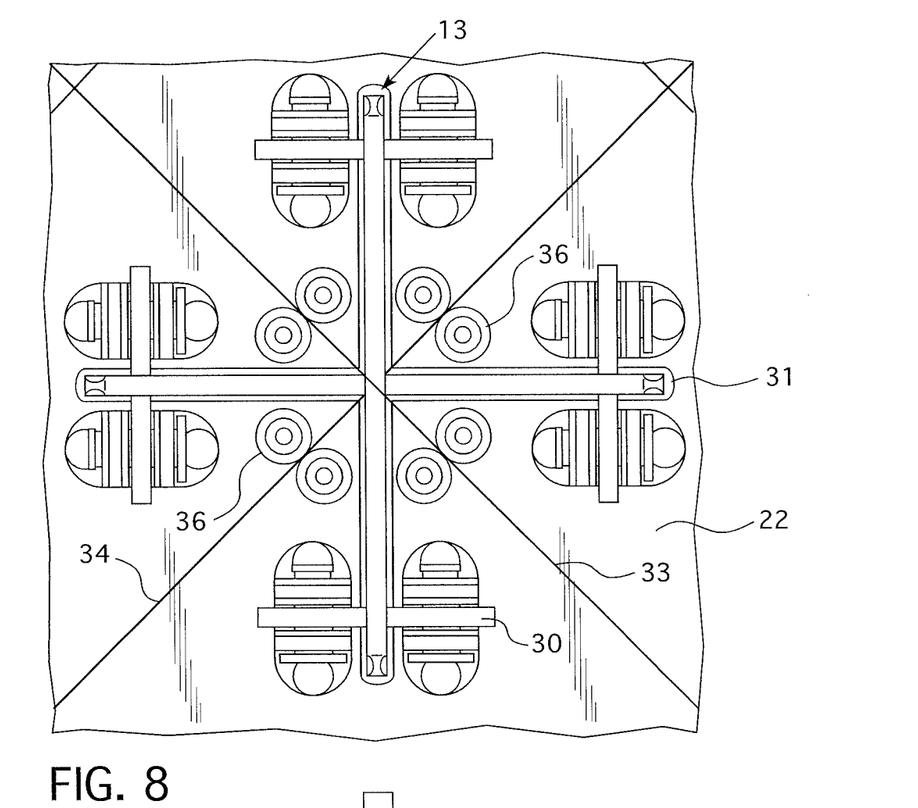
FIG. 8 is a portion of the plan view of FIG. 4 showing the control rod extending through the opening in the base plate.
Figure 9:
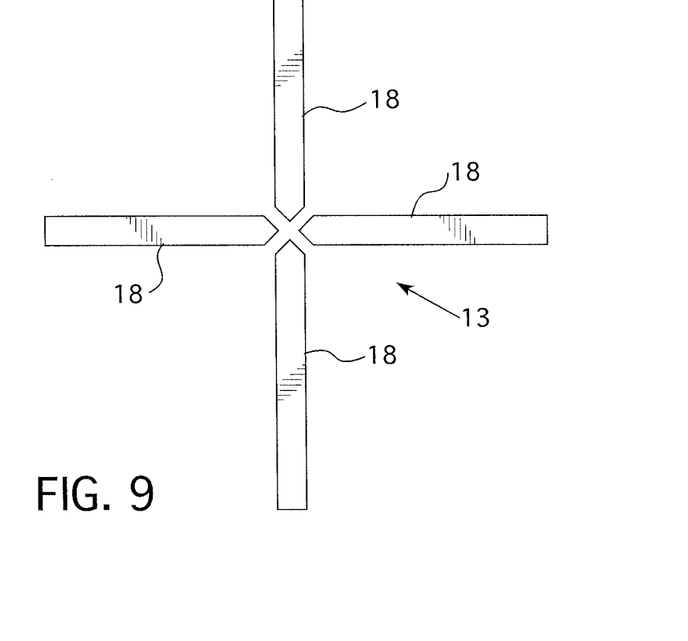
FIG. 9 is a plan view of the cut through the spline of the control rod.

The band saw 21 has two blades 33 and 34, with the teeth on each blade oriented in the downward direction, and has two wheels or pulleys associated with each band saw blade; a drive wheel 24 and first adjustable guide wheel 25 associated with the band saw blade 33 and a follower wheel 26 and second adjustable guide wheel 27 associated with the band saw blade 34. Band saw blade 33 is wrapped around the drive wheel 24 and extends between the drive wheel 24 and the first guide wheel 25, while band saw blade 34 is wrapped around the follower wheel 26 and extends between the follower wheel 26 and the second guide wheel or pulley 27. Each set of pulley wheels, i.e., 24 and 25, and 26 and 27, is located at a different height level above the base plate 22 (approximately 50 millimeters apart). The hydraulic motor 28 is located under the tool base plate 22, with a drive shaft that extends through the base plate and is mechanically connected, either directly or indirectly, to drive the drive wheel 24 and, thus, the blade 33. A chain 29 on gear wheel or sprocket 35 on the drive shaft of the motor 28 connects to the follower wheel 26 and creates propulsion for the other blade 34. The blades are preferably located 90° apart from each other and as shown in FIG. 8 and rotate at the same speed. Top guide rollers 30 on the upper surface of the band saw base plate 22 guide the control rod blades 18 through the precision cut across the center of the spline 20 of the control rod 13. Similarly, lower control rod guides 39, which are shown in FIG. 7 and in greater detail in FIG. 6, guide and positively support the control rod blades as they are fed through the cruciform opening 31 in the base plate 22. A spring tensioned roller ball 41 on each of the four lower guides positively grips the control rod blades 18 as they are fed through the opening 31 in the base plate 22. The band saw blades 33 and 34 cross over the opening 31 in the base plate 22 through which the control rod 13 passes and makes two orthogonal cuts in the spline centered between adjacent panels to separate the spline into four substantially equal, separate pieces, with each piece connected to a panel 18 as shown in FIG. 9. As can be appreciated from FIG. 4 the saw band guides 36, through which the saw blades extend, as can best be seen in FIGS. 2 and 8, assure the blades are properly centered over the spline 20 and cameras 32 provide the option of viewing the operation remotely. As shown in FIG. 5, tensioners 40 on the underside of the base plate 22 place a positive radial outward force on the shafts on which the first and second adjustable pulley wheels 25 and 27 turn, to assure adequate tension is maintained on the saw bands 33 and 34.

Accordingly, after the control rod 13 is secured at the bottom of the pool the double bladed band saw 21 is attached to the vertical rail 23 and a feeding system, such as an overhead hoist, moves the double bladed band saw downwards as the motor 28 rotates the blades 33 and 34. The lower control rod guides 39 (as shown in FIG. 7) guide the top of the control rod 13 to the right position and the spring tensioned roller ball 41 positively grip the blades 18 to align and feed the blades through the opening 31. The double bladed band saw 21 is lowered until the lowest blade 34 reaches the control rod top handle, where the handle has not been previously cut off, as mentioned above. The handle 10, or the top of the spline 20, as the case may be, is first cut by the bottom blade 34 and secondly by the top blade 33. The double bladed band saw band guides 36 guide the cut to be performed exactly at the center of the control rod. The vertical feeding along the rail 23 moves the double bladed band saw 21 downwards until the control rod center cut is complete. The upper roller guides 30 hold the control rod blades 18 firmly so no vibration occurs during the sawing process.

The double bladed band saw provides for significantly lower cutting and handling times on site and simplifies handling of the cut control rod blades. Additionally, the doubled bladed band saw keeps a clean environment in the pool and provides for precise segmentation which increases the packing efficiency in the expensive storage containers. Furthermore, this tool provides full control of the process that can be easily monitored with submerged cameras 32 for plant safety.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the general concepts disclosed and any and all equivalents thereof.

What is claimed is:

1. A tool for making two substantially simultaneous cuts along an elongated length of a spline of a boiling water reactor cruciform shaped control rod having four elongated panels radially extending at spaced locations around a circumference of the spline, with each of the panels having two oppositely facing sides and the spline having a central axis extending along the elongated length, the tool comprising:
    a tool base plate oriented in a substantially horizontal position, substantially perpendicular to the central axis when the control rod is in position to be cut, and the tool base plate is configured to be moved vertically;
    a first pair of spaced pulley wheels rotatably supported from one side of the tool base plate with one of the first pair of spaced pulley wheels comprising a drive wheel that is operatively connected to a motor to rotate the drive wheel when the motor is in an on state and a second of the first pair of spaced pulley wheels oriented along a first axis extending between the drive wheel and the second of the first pair of spaced pulley wheels;
    a first band saw blade having a first set of teeth facing in a downward direction, extending around the drive wheel and the second of the first pair of spaced pulley wheels wherein a first side of the first band saw blade extends between the drive wheel and the second of the first pair of spaced pulley wheels and around the second of the first pair of spaced pulley wheels and a second side of the first band saw blade extends between the second of the first pair of spaced pulley wheels and the drive wheel and around the drive wheel wherein the first side of the first band saw blade extends over a first opening in the tool base plate that is sized for the boiling water reactor control rod to axially pass through in a direction of the central axis and the first band saw travels in a first plane, around the drive wheel and the second of the first pair of spaced pulley wheels, substantially parallel to the one side of the tool base plate when the motor is in the on state;
    a second pair of spaced pulley wheels rotatably supported from the one side of the tool base plate with one of the second pair of spaced pulley wheels comprising a follower wheel that is operatively connected to the drive wheel to rotate the follower wheel when the motor is in an on state and a second of the second pair of spaced pulley wheels oriented along a second axis extending between the follower wheel and the second of the second pair of spaced pulley wheels, the second axis being oriented at a fixed angle greater or less than zero relative to the first axis; and
    a second band saw blade having a second set of teeth facing in the downward direction, extending around the follower wheel and the second of the second pair of spaced pulley wheels wherein a first side of the second band saw blade extends between the follower wheel and the second of the second pair of spaced pulley wheels and around the second of the second pair of spaced pulley wheels and a second side of the second band saw blade extends between the second of the second pair of spaced pulley wheels and around the follower wheel wherein the first side of the second band saw blade extends over the first opening in the tool base plate that is sized for the boiling water reactor control rod to pass through and the second band saw travels in a second plane, around the follower wheel and the second of the second pair of spaced pulley wheels, substantially parallel to the first plane, when the motor is in the on state.

2. The tool of claim 1 wherein the follower wheel is connected to the drive wheel with a chain and sprocket coupling.

3. The tool of claim 1 wherein the drive wheel and the follower wheel respectively drive the first and second band saw blades at approximately the same speed.

4. The tool of claim 1 wherein the first side of the first band saw blade and the first side of the second band saw blade cross one another over the central axis when the boiling water reactor control rod is positioned in the first opening in the tool base plate.

5. The tool of claim 1 wherein the opening in the tool base plate includes guide supports extending from the tool base plate to contact, ride along and guide each side of the panels through the first opening in the tool base plate when the boiling water reactor control rod panels extend through the opening.

6. The tool of claim 5 wherein the guide supports on either side of each panel are supported about the first opening at a different elevation relative to the central axis.

7. The tool of claim 6 wherein the different elevations are approximately 50 mm apart.

8. The tool of claim 6 wherein the guide supports extend above and below the tool base plate.

9. The tool of claim 1 wherein the tool base plate includes a second opening through which a guide pole can extend to guide movement of the tool base plate in a direction parallel to the central axis when the boiling water reactor control rod panels extend through the first opening.

10. The tool of claim 9 including means for moving the tool base plate along a direction parallel to the central axis.

11. The tool of claim 10 wherein the means for moving the tool base plate is an overhead hoist.

12. The tool of claim 9 including the guide pole and means for supporting the guide pole on a bottom of a spent fuel pool.

13. The tool of claim 9 wherein the guide pole is a guide rail configured to be supported from a reactor building floor with the guide rail extending down into a spent fuel pool.

14. The tool of claim 13 wherein the guide rail is configured to extends down into the spent fuel pool at least six meters.

15. The tool of claim 1 wherein the first and second band saw blades operate to substantially simultaneously cut the boiling water reactor control rod vertically along the spline dividing the boiling water reactor control rod spline into four substantially equal sections.

16. The tool of claim 1 wherein when in an upper position above the boiling water reactor control rod the tool can be rotated 180 degrees to facilitate maintenance.

17. The tool of claim 1 wherein the motor is a hydraulic motor.

18. The tool of claim 1 including a camera on the tool base plate for managing the cutting process.

19. The tool of claim 18 wherein the camera includes a plurality of cameras.

20. The tool of claim 1 wherein the fixed angle is approximately ninety degrees.

\* \* \* \* \*